UNITED STATES PATENT OFFICE.

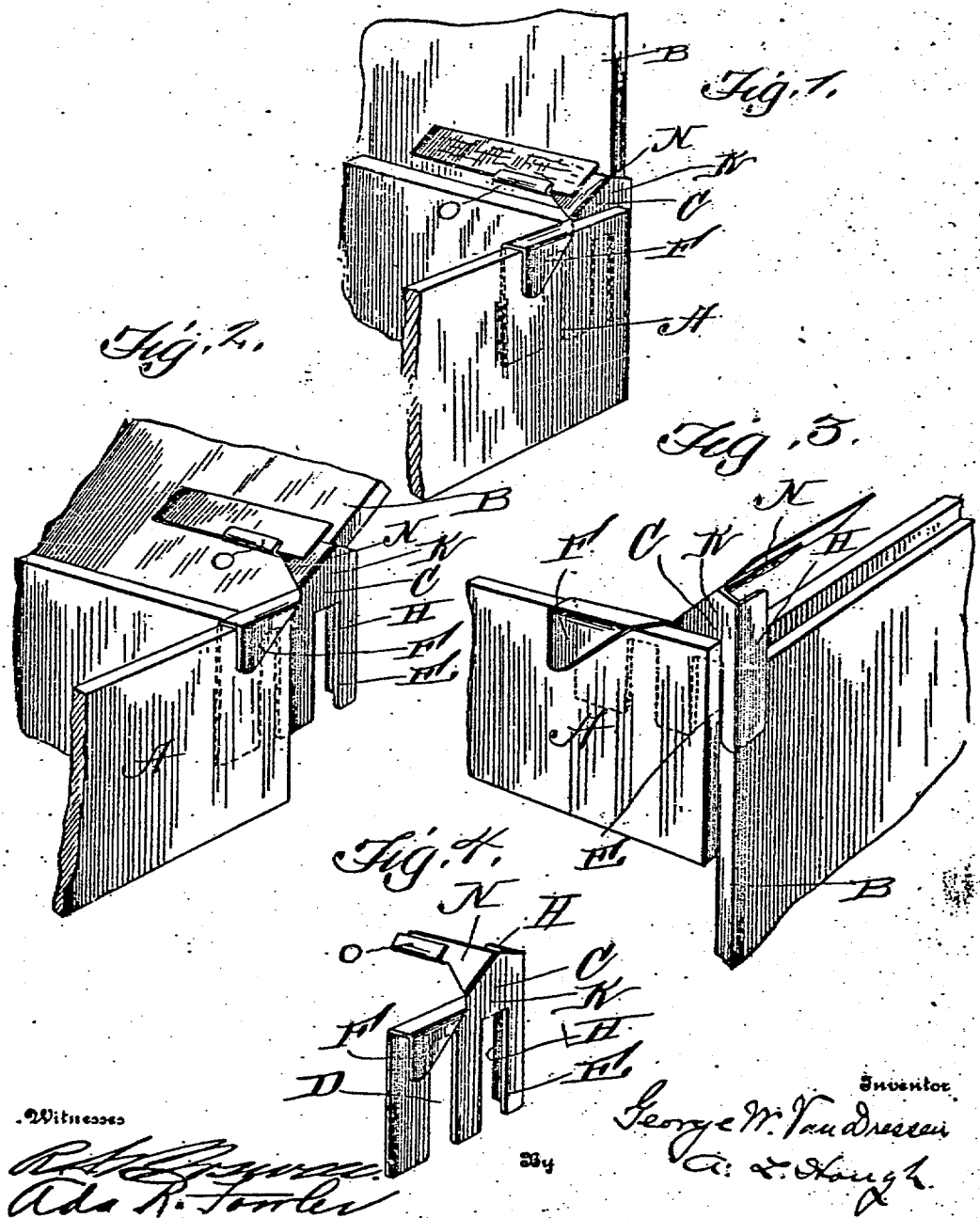

GEORGE W. VAN DRESSEN, OF LOWVILLE, NEW YORK, ASSIGNOR TO JULIAN N. LANPHER, OF LOWVILLE, NEW YORK.

BOX-COVER HOLDER.

No. 887,153.

Specification of Letters Patent.

Patented May 12, 1908.

Application filed June 14, 1907. Serial No. 379,060.

*To all whom it may concern:*

Be it known that I, GEORGE W. VAN DRESSEN, a citizen of the United States, residing at Lowville, in the county of Lewis and State of New York, have invented certain new and useful Improvements in Box-Cover Holders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for holding box covers open and in different positions and comprises a simple and efficient device made preferably of a sheet of thin metal and having a downwardly bent flange to catch over the upper end or side of a box and having a plurality of slots adapted to receive the wall of the box to which the cover is hinged, one edge of the plate also being bent to form a flange for receiving the cover.

The invention consists in various other details of construction and combinations and arrangements of parts which will be hereinafter fully described and then specifically defined in the appended claims.

I illustrate my invention in the accompanying drawings, in which:—

Figure 1 is a perspective view showing my device as applied to a box and holding the cover in a vertical position. Fig. 2 is a similar view showing it holding the cover at an inclination. Fig. 3 is a view showing the cover held at its farthest downward throw and against the back of the box and Fig. 4 is a perspective view of the device.

Reference now being had to the details of drawings by letter, A designates a box and B a cover hinged thereto.

C designates my improved box cover holder and is made preferably of thin sheet metal and is provided with two slots D and E which are formed in the lower edge thereof and parallel to each other and spaced apart. Said slots are preferably of such a width as to allow the same to receive the wall of the box to which the cover is hinged, as shown clearly in the various figures of the drawings.

F designates a downwardly turned angled flange, which being preferably of resilient material engages the box with sufficient friction to hold the device upon the box.

One edge of the plate is bent to form a right angled flange H which extends above the flange F, as does also the portion of the plate K, and N designates an inclined flange which is bent at an angle above the flange F, leaving a space between the upper edge thereof and the flange H for the reception of the box cover. The inclined flange N has its lower edge bent upon itself to form a card holder O.

In adjusting the device to the box, the flange F is caught over the end of the box adjacent to the hinged wall thereof and, if it is desired to hold the cover in a vertical position, the edge of the cover is inserted in the slot between the flanges N and H and the slot E is pushed down to receive the back wall of the box to which the cover is hinged. As the device is pushed down over the edge of the box, the flange F will engage the end wall of the box, as shown in Figs. 1 to 3 inclusive, and the cover will be held in a vertical position. If it is desired to hold the cover at an inclination, as shown in Fig. 2 of the drawings, the slot D receives the back of the box to which the cover is hinged, the cover being held at an inclination conforming to the inclined flange N and, when it is desired to hold the box at its farthest downward throw or flat against the back of the box, the plate is held in a position shown in Fig. 1 of the drawings, the flange H at the end of the plate serving to hold the cover flat against said back.

From the foregoing, it will be noted that by the provision of the device shown and described a simple and efficient device is afforded whereby the back of a box may be held in three positions as may be desired.

What I claim to be new is:

1. A device for holding covers of boxes at different inclinations comprising a sheet of metal which has a plurality of slots adapted to fit over the top of the rear wall of the box, a downwardly bent flange at the top of the plate for engagement over the end of the box, one end of the plate bent at an angle and coöperating with the laterally bent wings of the plate to engage and hold a cover, as set forth.

2. A device for holding covers of boxes at different inclinations comprising a sheet of metal which has a plurality of slots adapted to fit over the top of the rear wall of the box, plate for engagement over the end of the box, one end of the plate bent at an angle and cooperating with the laterally bent wings of the plate to engage and hold a cover, said laterally bent wing having a portion of itself bent to form a card holder, as set forth.

3. A device for holding covers of boxes at different inclinations comprising a sheet of metal which has a plurality of slots adapted to f t over the top of the rear wall of the box, a downwardly bent flange at the top of the plate for engagement over the end of the box, one end of the plate being bent at an angle and adapted to engage a cover and hold the upper surface thereof against the rear wall of the box, as set forth.

In testimony whereof I hereunto affix my signature in presence of two witnesses.

GEORGE W. VAN DRESSEN.

Witnesses:
C. H. BADLAM,
H. M. MILLS.

---

Correction in Letters Patent No. 887,153.

It is hereby certified that the name of the assignee in Letters Patent No. 887,153, granted May 12, 1908, upon the application of George W. Van Dressen, of Lowville, New York, for an improvement in "Box-Cover Holders," was erroneously written and printed "Julian N. Lanpher," whereas the said name should have been written and printed *Julian L. Lanpher;* and that the said Letters Patent should be read with this correction therein that the same may conform to the record of the case in the Patent Office.

Signed and sealed this 14th day of July, A. D., 1908.

[SEAL.]

E. B. MOORE,
*Commissioner of Patents.* plate for engagement over the end of the box, one end of the plate bent at an angle and coöperating with the laterally bent wings of the plate to engage and hold a cover, said laterally bent wing having a portion of itself bent to form a card holder, as set forth.

3. A device for holding covers of boxes at different inclinations comprising a sheet of metal which has a plurality of slots adapted to ft over the top of the rear wall of the box, a downwardly bent flange at the top of the plate for engagement over the end of the box, one end of the plate being bent at an angle and adapted to engage a cover and hold the upper surface thereof against the rear wall of the box, as set forth.

In testimony whereof I hereunto affix my signature in presence of two witnesses.

GEORGE W. VAN DRESSEN.

Witnesses:
C. H. BADLAM,
H. M. MILLS.

---

Correction in Letters Patent No. 887,153.

It is hereby certified that the name of the assignee in Letters Patent No. 887,153, granted May 12, 1908, upon the application of George W. Van Dressen, of Lowville, New York, for an improvement in "Box-Cover Holders," was erroneously written and printed "Julian N. Lanpher," whereas the said name should have been written and printed *Julian L. Lanpher;* and that the said Letters Patent should be read with this correction therein that the same may conform to the record of the case in the Patent Office.

Signed and sealed this 14th day of July, A. D., 1908.

[SEAL.]

E. B. MOORE,
*Commissioner of Patents.*

Correction in Letters Patent No. 887,153.

It is hereby certified that the name of the assignee in Letters Patent No. 887,153, granted May 12, 1908, upon the application of George W. Van Dressen, of Lowville, New York, for an improvement in "Box-Cover Holders," was erroneously written and printed "Julian N. Lanpher," whereas the said name should have been written and printed *Julian L. Lanpher;* and that the said Letters Patent should be read with this correction therein that the same may conform to the record of the case in the Patent Office.

Signed and sealed this 14th day of July, A. D., 1908.

[SEAL.]

E. B. MOORE,
*Commissioner of Patents.*